3,062,883
PREPARATION OF ALKANOIC ACID AMIDES THROUGH HYDROLYSIS OF ALKYL CYANIDES
Everett E. Gilbert, Morris Township, Morris County, and Edmund J. Rumanowski, Jersey City, N.J., assignors to Allied Chemical Corporation, New York, N.Y., a corporation of New York
No Drawing. Filed July 13, 1960, Ser. No. 42,493
9 Claims. (Cl. 260—561)

This invention relates to the production of saturated aliphatic amides from saturated aliphatic nitriles. These amides have, among others, known utility as solvents, stabilizers, or starting reactants for the production of other useful compounds.

Nitriles can be hydrolyzed to amides in accordance with the reaction (I) $\quad\quad\quad RCN + H_2O \rightarrow RCONH_2$ It is known that the amides formed hydrolyze to form the acid in accordance with the equation (II) $\quad\quad RCONH_2 + H_2O \rightarrow RCOOH + NH_3$ and that undesired reaction II proceeds many times faster than the desired reaction I (Jour. Am. Chem. Soc. 61, 560 (1939)).

Hydrolysis of nitriles to amides by passage of the nitrile over a silica-alumina catalyst at 1,000 pounds pressure at 400–500° F. or passage of the nitrile with steam over zinc oxide at 240° C., has been suggested. These relatively high temperature processes require the use of special equipment which makes such processes unattractive from an economic standpoint. Alkaline hydrolysis of nitriles usually gives the alkali salts of the acids with liberation of ammonia.

It is among the objects of the present invention to provide a process of hydrolyzing nitriles to produce amides, which process does not require the high temperatures and special equipment of the prior known procedures and results in good yields of the amide.

Other objects and advantages of the present invention will be apparent from the following detailed description thereof.

In accordance with this invention, saturated aliphatic nitriles (alkyl cyanides) having from 2 to 5 carbon atoms are hydrolyzed by mixing the nitrile with a styrene divinyl benzene copolymer substituted on the benzene rings by tetramethyl ammonium hydroxide moieties, containing occluded or absorbed water, in the proportions of at least 3, preferably 3 to 10, mols of nitrile per mol of water, and the mixture heated to a temperature of from 50° to 120° C. Surprisingly, we have found that operating under these conditions about one mol, or at least the major portion of a mol of the nitrile, is converted to the corresponding amide with little or no formation of the acid and consequent production of high yields of the amide as the unreacted nitrile can be recovered and recycled, and thus eventually converted to amide.

For economic operation it is important to recover the styrene divinyl benzene copolymer, which, in the interests of brevity, will be hereinafter referred to as a strongly basic resin. This can readily be accomplished by decantation and/or filtration of the reaction mixture to separate the strongly basic resin from the liquid containing the amide, washing the resin with a solvent such as water or methylene chloride for the aliphatic nitrile (acetonitrile, propionitrile, butyronitrile or amylonitrile, depending upon the nitrile subjected to hydrolysis), then treating the resin with caustic soda and washing the thus treated resin with water, preferably distilled water, until the wash is neutral. Before reuse the strongly basic resin should be reactivated by an alkaline treatment, such as described above, to effect removal of any acid by-product which interferes with the activity of the strongly basic resin; acetic acid, for example, in the case of acetonitrile.

It is important to use a large excess, at least about 3 mols of nitrile, relative to the amount of water present in the reaction mixture. Approximately stoichiometric amounts of nitrile and water do not give good yields. On the other hand, the use of from 3 to 10 mols of nitrile per mol of water, which represents an excess of from 200% to 900% of nitrile gives good yields. The unreacted nitrile can be recovered and reused and hence does not represent a loss in carrying out the process.

It is also important that the water be occluded or absorbed in the resin. The use of predried resin mixed with water and the nitrile does not give good yields of the amide. The nitrile recirculated may take up some water from the reaction mixture and the water thus introduced into the reaction mixture should be taken into account in computing the relative proportions of nitrile and water present in the reaction mixture. The amount of water occluded in the resin thus controls the amount of resin used in carrying out the process. Strongly basic resins, produced as hereinafter set forth, usually contain from 50% to 60% water. Hence an amount of resin is used to give the desired ratio of nitrile to water which, as above noted, is at least 3 mols of nitrile per mol of water. Thus employing a strongly basic resin containing 57% water and a mol ratio of nitrile to water of 3 to 1, about 31 parts of resin are used for each 3 mols of nitrile.

The strongly basic resin may be made by known techniques. For example, copolymers of divinyl benzene and styrene are produced by reacting styrene with from 1% to 8% by weight of divinyl benzene based on the weight of styrene. The resultant copolymer is reacted with formaldehyde and hydrogen chloride to introduce chloromethyl groups in the benzene rings; approximately stoichiometric amounts may be used. The resultant product is reacted with trimethylamine, using approximately the stoichiometric amount to introduce a trimethylamine substituent in each benzene ring. This product is then reacted with sodium hydroxide to exchange the hydroxyl group of the chloride employing an excess of sodium hydroxide to insure that all the chloride atoms are replaced. Such strongly basic resins, in the chloride form, are available as commercial products, for example, the Dowex series 1x1, 1x2, 1x4, 1x8, 2x4, 2x8. In this series, the integers 1, 2, 4 and 8 following the 1x indicates the percentage content of divinyl benzene which is a measure of the crosslinking; thus, this series of Dowex resins contains from 1% to 8% by weight of divinyl benzene. Other strongly basic resins of this type are Rohm and Haas 400 and 401 and Permutit A and S-2.

The strongly basic resin is employed in finely divided form. It may have a particle size such that it is retained on a 100 or 200 mesh screen and passes through a 20 mesh screen (United States Standard screen size). Since mesh sizes of 16–120 (through 120 and retained on 16) and 20–50 are available as commercial products, they are preferred. However the exact particle size is not critical as long as the resin is in the form of relatively small particles.

The reaction is carried out within the range of from 50° to 120° C., preferably 70° to 90° C. under atmospheric pressure conditions. Yield of the amide at reflux temperature is markedly greater than at 50° C. On the other hand the rate of resin deterioration increases with increase in temperature. Acetonitrile, which boils at 80° C., can be refluxed with the resin under atmospheric pressure conditions. In the case of the other nitriles which have higher boiling points, the hydrolysis can be carried out under reflux at 120° C. using moderate pressures with good yields and satisfactory life of the resin.

Use of higher pressures permits use of higher temperatures, but such higher pressures are obviously undesirable requiring, as they do, special costly equipment.

The reaction time will depend on the temperature. In general, the higher the temperature the shorter the reaction time. Above 80° C., short times of the order of one-half to one hour will give good yields. At 80° C. there is little advantage in conducting the hydrolysis for more than 3.5 hours. Below 80° C. the yield increases with time.

The process may be carried out batchwise or continuously. In the case of continuous operation nitrile and particles of strongly basic resin are fed continuously to the inlet end of a reaction zone to provide at least 3 mols of nitrile per mol of water in the resin, the resultant mixture fed through the reaction zone maintained at reaction temperature, the reaction mixture discharged into a decanter or filter where the resin particles are separated from the liquid and the latter treated to recover the amide therefrom. The resin particles are regenerated and recycled to the inlet end of the reaction zone.

The resin separated as above described was washed with water to remove the acetonitrile, then treated with caustic soda and washed with water in the same manner as described above in connection with the conversion of the chloride in the resin to the hydroxyl form. The resin thus regenerated after each use was reused in four succeeding batches, each as above described, without loss in weight or change in physical appearance and without loss in yield of the amide formed.

EXAMPLE II

*Acetonitrile to Acetamide*

In the table which follows is given data on a series of runs involving recycle of the unreacted acetonitrile and strongly basic resin with regeneration of this resin as hereinabove described from one run to the next. The reaction was carried out under reflux for 1½ hours in all runs.

The top value in the first three columns of this table, after the run number for each run, is in parts by weight and the bottom values for the said run are in mols.

TABLE

| Run | $CH_3CN$ | $H_2O$ in Wet Resin | Parts $H_2O$ in Recycled $CH_3CN$ | Molar Ratio, $CH_3CN/H_2O$ | Parts Total Resin | Parts Wet Resin Recovered | Parts Amide | Parts by Weight of Amide per Parts by Weight of Resin |
|---|---|---|---|---|---|---|---|---|
| 1 | 1,767 / 43 | 163 / 9 | ---------- | 4.8/1 | 276 | 156 | 193 | 1.71 |
| 2 | 1,665 / 40.5 | 163 / 9 | 61 / 3.4 | 3.3/1 | 277 | 158 | 148 | 1.31 |
| 3 | 3,088 / 75.2 | 167 / 9.3 | 134 / 7.4 | 4.5/1 | 281 | 163 | 218 | 1.93 |
| 4 | 1,776 / 43.2 | 172 / 9.6 | ---------- | 4.5/1 | 285 | 159 | 239 | 2.11 |
| 5 | 2,277 / 55.4 | 168 / 9.3 | 53 / 2.9 | 4.5/1 | 281 | 160 | 194 | 1.71 |

The saturated aliphatic nitriles containing from 2 to 5 carbon atoms used may be the commercially available nitriles. For example, in the case of acetonitrile, the acetonitrile available as a by-product from the production of acrylonitrile by reacting propylene and ammonia can be used.

The following examples are given for illustrative purposes; it will be appreciated that this invention is not limited to these examples.

In all examples, the strongly basic resin used was Dowex 1x4 (20–50 mesh) which was first treated to convert it from the chloride form to the hydroxyl form, i.e., to produce the ammonium hydroxide moieties. This treatment involved mixing 273 parts of the resin which contained 57% water with 1365 parts of 10% aqueous sodium hydroxide at 35° C. (±5°) for 20 minutes and then filtering to separate the resin particles. The separated resin particles were stirred for five minutes with 800 parts of distilled water and the resultant mixture filtered to separate the resin particles. This water treatment was repeated twice; at the end of the third treatment the water was neutral.

EXAMPLE I

*Acetonitrile to Acetamide*

281 parts of the resin containing 168 parts of water (9.3 mols) was added to 1722 parts (41.9 mols) of acetonitrile in a reaction vessel equipped with a stirrer, thermometer and reflux condenser. The mixture was stirred and refluxed at 80° C. for 90 minutes. Thereafter the resin was separated by decantation, and the nitrile solution distilled to a final pot temperature of 170° C. The residue in the vessel was acetamide, melting point 80–81° C., obtained in a yield of 190 parts (3.2 mols). It was white in color and completely soluble in chloroform.

EXAMPLE III

*Propiontrile to Propionamide*

15.3 parts of the strongly basic resin containing 9 parts of water was mixed with 124 parts of propionitrile. Thus the reaction mixture had a molar ratio of propionitrile to water of 4.5 to 1. The mixture was heated to 78° to 80° C. for 1½ hours. Thereafter the resin was separated by filtration and the residual liquid reaction mixture distilled to remove the unreacted propionitrile. Six parts of propionamide having a melting point of 72–75° C. was thus obtained.

EXAMPLE IV

*n-Butyronitrile to n-Butyramide*

7.65 parts of the resin containing 4.5 parts of water was mixed with 77.8 parts of n-butyronitrile. The reaction mixture thus contained a molar ratio of n-butyronitrile to water of 4.5 to 1. The mixture was heated to 78–80° C. for 1½ hours. The resin thereafter was separated by filtration and the liquid filtrate distilled to remove the unreacted n-butyronitrile. 1.3 parts of n-butyramide having a melting point of 114–115° C. was obtained as product.

EXAMPLE V

*Iso-Butyronitrile to Iso-Butyramide*

15.3 parts of resin containing 9 parts of water was mixed with 155.5 parts of iso-butyronitrile. The reaction mixture contained 4.5 mols of the iso-butyronitrile per mol of water. The mixture was heated to 78° to 80° C. for 1½ hours, thereafter the resin separated by decantation, and the liquid distilled to remove the unreacted iso-butyronitrile. 2.5 parts of the iso-butyramide having a melting point of 127–129° C. was obtained as product.

It will be noted that the present invention provides a process of hydrolyzing saturated aliphatic nitriles having from 2 to 5 carbon atoms to produce the corresponding amides, which process is carried out at moderate temperatures not exceeding about 120° C. and preferably at 70° to 90° C. and results in good yields of the amide with little or no formation of the acid.

In this specification all parts and percentages are on a weight basis.

Since certain changes may be made in carrying out the above hydrolysis method without departing from the scope of the invention, it is intended that all matter contained in the above description shall be interpreted as illustrative and not in a limiting sense.

What is claimed is:

1. The process of hydrolyzing alkyl cyanides of from 2 to 5 carbon atoms which comprises heating the alkyl cyanide in admixture with styrene divinyl benzene copolymer substituted on the benzene rings by tetramethyl ammonium hydroxide moieties and containing occluded water, in the proportions of at least 3 mols of alkyl cyanide per mol of water in the reaction mixture, to a temperature of from 50° to 120° C., the amount of said copolymer present in the reaction mixture being sufficient to provide, as water in the copolymer, the aforesaid ratio of water to alkyl cyanide, and recovering the amide reaction product from the reaction mixture.

2. The process of hydrolyzing alkyl cyanides of from 2 to 5 carbon atoms which comprises mixing a solid particulate styrene divinyl benzene copolymer substituted on the benzene rings by tetramethyl ammonium hydroxide moities and containing occluded water with the alkyl cyanide, in the proportions of at least 3 mols of the alkyl cyanide per mol of water in the reaction mixture, the amount of said copolymer present in the reaction mixture being sufficient to provide, as water in the copolymer, the aforesaid ratio of water to alkyl cyanide, heating the resultant mixture to a temperature of from 50° to 120° C., separating the reaction liquid from the solid copolymer particles and recovering the amide reaction product from the reaction liquid.

3. The process as defined in claim 2, in which the solid copolymer particles separated from the reaction mixture are regenerated and reused in the hydrolysis of alkyl cyanides of from 2 to 5 carbon atoms.

4. The process as defined in claim 2, in which the mixture of solid particles of styrene divinyl benzene copolymer and alkyl cyanide is refluxed for a period of time sufficient to convert at least the major portion of a mol of the alkyl cyanide to the corresponding amide.

5. The process as defined in claim 2, in which the unreacted alkyl cyanide recovered from the reaction mixture and the styrene divinyl benzene copolymer separated from the reaction mixture after regeneration of the styrene divinyl benzene copolymer are mixed with additional alkyl cyanide to provide a reaction mixture containing at least 3 mols of alkyl cyanide per mol of water in the reaction mixture, and the resultant mixture is heated to a temperature within the range of from 50° to 120° C. to hydrolyze the alkyl cyanide to amide.

6. The process of hydrolyzing acetonitrile to acetamide which comprises mixing from 3 to 10 mols of acetonitrile with styrene divinyl benzene copolymer substituted on the benzene rings by tetramethyl ammonium hydroxide moieties containing from 50% to 60% by weight of water, the amount of said styrene divinyl benzene copolymer mixed with the nitrile being about the amount required to provide one mol of water in the reaction mixture as water in the copolymer, heating the reaction mixture to from 50° to 100° C., separating the styrene divinyl benzene copolymer from the liquid reaction mixture and recovering acetamide from the separated liquid reaction mixture.

7. The process of hydrolyzing propionitrile to propionamide which comprises mixing from 3 to 10 mols of propionitrile with styrene divinyl benzene copolymer substituted on the benzene rings by tetramethyl ammonium hydroxide moieties containing from 50% to 60% by weight of water, the amount of said styrene divinyl benzene copolymer mixed with the nitrile being about the amount required to provide one mol of water in the reaction mixture as water in the copolymer, heating the reaction mixture to from 50° to 100° C., separating the styrene divinyl benzene copolymer from the liquid reaction mixture and recovering propionamide from the separated liquid reaction mixture.

8. The process of hydrolyzing iso-butyronitrile to iso-butyramide which comprises mixing from 3 to 10 mols of iso-butyronitrile with styrene divinyl benzene copolymer substituted on the benzene rings by tetramethyl ammonium hydroxide moieties containing from 50% to 60% by weight of water, the amount of said styrene divinyl benzene copolymer mixed with the nitrile being about the amount required to provide one mol of water in the reaction mixture as water in the copolymer, heating the reaction mixture to from 50° to 100° C., separating the styrene divinyl benzene copolymer from the liquid reaction mixture and recovering iso-butyramide from the separated liquid reaction mixture.

9. The process of hydrolyzing n-butyronitrile to n-butyramide which comprises mixing from 3 to 10 mols of n-butyronitrile with styrene divinyl benzene copolymer substituted on the benzene rings by tetramethyl ammonium hydroxide moieties containing from 50% to 60% by weight of water, the amount of said styrene divinyl benzene copolymer mixed with the nitrile being about the amount required to provide one mol of water in the reaction mixture as water in the copolymer, heating the reaction mixture to from 50° to 100° C., separating the styrene divinyl benzene copolymer from the liquid reaction mixture and recovering iso-butyramide from the separated liquid reaction mixture.

References Cited in the file of this patent

Krewson et al.: "J. of the Amer. Chem. Soc.," vol. 65, pp. 2256–57 (1943).

Galat: "J. of the Amer. Chem. Soc.," vol. 70, p. 3945 (1948).

Degering: "An Outline of Organic Nitrogen Compounds," published by University Lithoprinters (Ypsilanti, Mich.), p. 508 (1950).

Wagner et al.: "Synthetic Organic Chemistry," published by John Wiley & Sons, Inc. (N.Y.), page 570 (1953).

Calmon et al.: "Ion Exchangers in Organic and Biochemistry," published by Interscience Publishers, Inc. (N.Y.), pages 658–659, 663–668 (1957).